United States Patent [19]

Gale

[11] 4,346,428
[45] Aug. 24, 1982

[54] COUPLING ASSEMBLY WITH BONDING JUMPER

[75] Inventor: Edwin J. Gale, Aurora, Colo.

[73] Assignee: Stanley Aviation Corp., Denver, Colo.

[21] Appl. No.: 156,665

[22] Filed: Jun. 5, 1980

[51] Int. Cl.³ ............................................. H01R 3/04
[52] U.S. Cl. .................................... 361/215; 174/47; 174/78; 339/15
[58] Field of Search ..................... 361/215; 174/47, 78, 174/84 S, 94 S; 285/409; 339/15

[56] References Cited

U.S. PATENT DOCUMENTS

| | | | |
|---|---|---|---|
| 2,882,071 | 4/1959 | Klompar | 285/409 |
| 3,891,291 | 6/1975 | Nadsady et al. | 339/15 |
| 3,999,825 | 12/1976 | Cannon | 339/15 |
| 4,008,937 | 2/1977 | Filippi | 285/409 |
| 4,249,786 | 2/1981 | Mahoff | 339/15 |

FOREIGN PATENT DOCUMENTS 588072  5/1947  United Kingdom ................ 361/215

Primary Examiner—J. D. Miller
Assistant Examiner—L. C. Schroeder
Attorney, Agent, or Firm—Gary D. Fields

[57] ABSTRACT

A coupling assembly is provided including a pair of confronting conduit members. Each conduit member has an annular flange fixed to the confronting ends of the conduit members. A circumferentially extending coupler surrounds portions of the flanges. A resilient bonding jumper transversing the circumferential wall of the coupler provides electrical continuity between the conduit members. The bonding jumper includes a body portion and a pair of arms fixed to opposite ends of the body portion. The arms extend in opposite directions. When the coupler is secured to the flanges, each arm contacts one of the flanges and a torque is produced tending to force the other arm into secure electrical contact with its contacted flange.

6 Claims, 4 Drawing Figures

U.S. Patent  Aug. 24, 1982  4,346,428
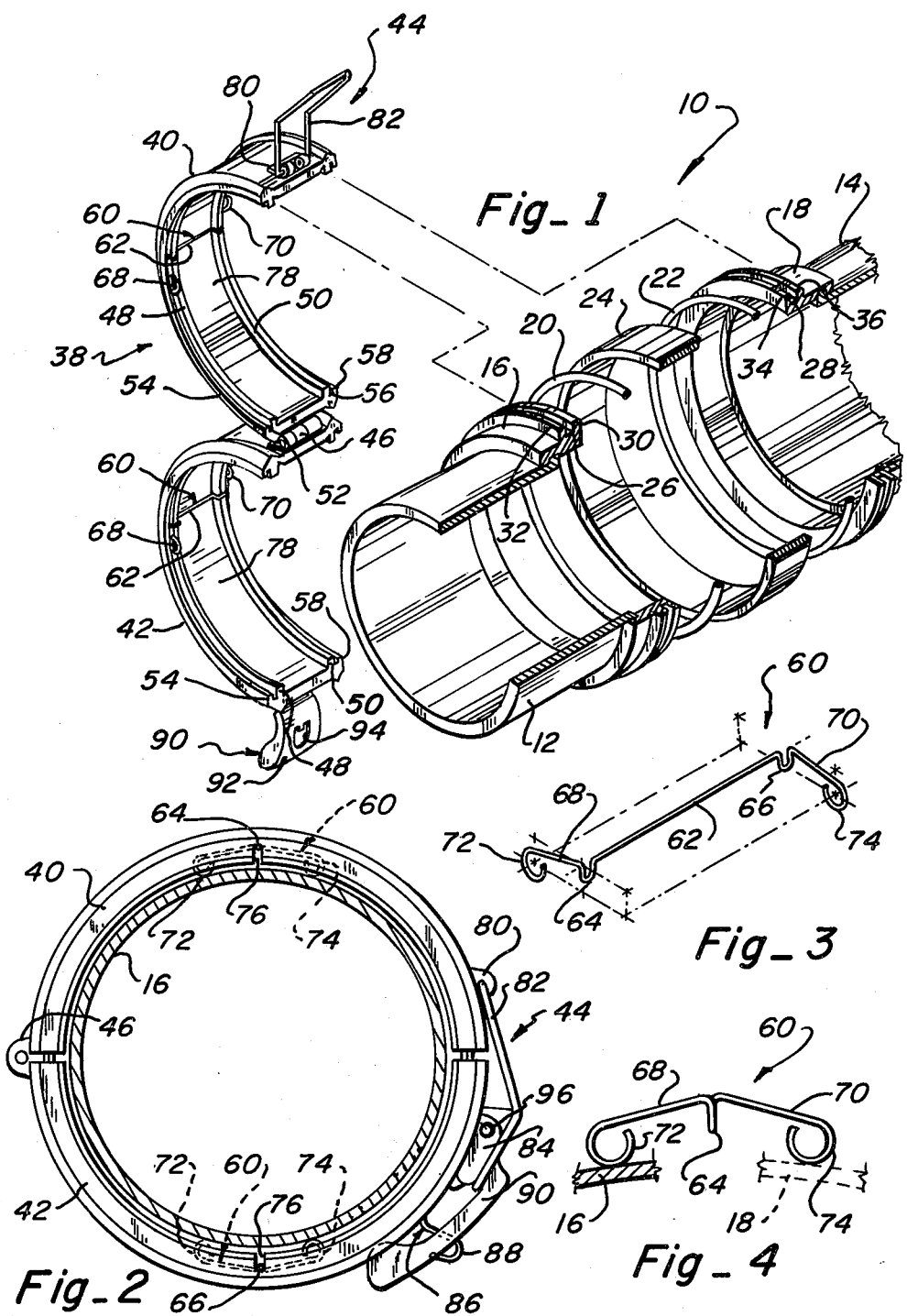

COUPLING ASSEMBLY WITH BONDING JUMPER

FIELD OF INVENTION

The present invention relates to coupling assemblies and, in particular, to a coupling assembly for interconnecting a pair of tubular conduit members in which the coupling assembly includes a bonding jumper for minimizing electrical charge build up on the conduit members.

BACKGROUND ART

When conveying fluid, such as jet fuel, between interconnected pipes, it is highly advisable to provide electrical continuity between the interconnected pipes. Electrical continuity assures that there will be no build up of an electrostatic charge on a first pipe relative to a second interconnected adjacent pipe. As a result, a potential difference between pipes or between a pipe and another reference surface is not created. It is readily understood that potential difference could give rise to an electrical spark and, in the presence of a vaporized fuel, the spark could cause the fuel to ignite. A number of patents have proposed solutions to this problem of electrostatic charge build up. In U.S. Pat. No. 4,008,937 to Filippi a coupling assembly is disclosed which is particularly adapted for use with fluid conveying lines. The coupling assembly includes an electrical jumper externally mounted thereon to minimize electrical charge build up and reduce the hazard of an electrical spark. In U.S. Pat. No. 3,891,291 to Nadsady et al. a tubular coupling is described which incorporates an electrical or bonding jumper. The bonding jumper includes an elongated leaf spring having undulations and made to fit wholly inside a retainer section. The leaf spring may include lateral projections which are wedged into locking engagement with side flanges within the retainer section. The leaf spring provides electrical contact between ferrules and fluid carrying tubular members. In U.S. Pat. No. 3,999,825 to Cannon a tubular coupling assembly is disclosed which comprises a pair of retainer sections. Each of the retainer sections has a groove formed therein for containing a U-shaped conducting wire.

SUMMARY OF THE INVENTION

In accordance with the present invention, a coupling assembly is provided with at least one electrical jumper for interconnecting two fluid conveying members and for minimizing the build up of an electrical charge on the conveying members. The coupling assembly includes a pair of tubular shaped conveying members which are interconnected by a generally circular shaped coupler having a pair of coupling halves. An electrical jumper is located in one of the coupling halves and comprises a body portion and a pair of arms extending in opposite directions and connected to opposite ends of the body portion. The longitudinal extent of the body portion transverses an inner circumferential wall of the coupling half while each of the arms is positioned to contact one of the conveying members. Since the arms extend in opposite directions, each arm will exert a torque on the body portion opposite that of the other arm. Consequently, when one arm is forced against one of the conveying members, the other arm is forced against the other conveying member. As a result, electrical continuity between the conveying members is established by the electrical jumper and the storing of an electrical charge on one of the conveying members is essentially prevented.

More particularly, a coupling assembly is provided which includes a pair of swingably joined, arcuate-shaped coupling halves for circumferentially surrounding a pair of annular flanges. Each flange is rigidly fixed to a conveying member. The conveying members are joined together by the flanges and coupling halves to carry fluid, such as jet fuel. Each flange includes an outside shoulder while each coupling half has a rib formed along each of its outer circumferential edges. The space between the ribs defines an inner circumferential wall. A resilient electrical jumper having a body portion transverses the inner circumferential wall of at least one of the coupling halves. An insert member is integrally joined at each of the ends of the body portion. Each insert member is wedgeably fitted in a slot formed in each of the ribs to secure the electrical jumper to the coupling half. An arm having a looped end is integrally joined to each insert member and is positioned beyond the inner circumferential wall on the side of the rib opposite that side adjacent the electrical jumper body portion. The arms extend from the insert members in opposite directions. The coupling halves circumferentially engage the annular flanges such that the ribs are located axially outwardly of the flange outside shoulders so that the relative axial movement of the conveying members will be minimized by the abutment of the ribs and shoulders. Each of the arms is thereby positioned to engage flange portions axially outwardly of the flange outside shoulders. The coupling assembly also includes a retaining assembly for securing the coupling halves to the flanges. When the coupling assembly is locked into place by the retaining assembly, each arm contacts one of the flanges. Since the arms extend in opposite directions, the torque developed by the contact of each arm with one of the flanges tends to force the other arm against its contacted flange. As a consequence, a strong contact is provided between the flange and electrical jumper and electrical continuity between the flanges and the two conveying members is provided.

Based on the foregoing description, the present invention meets a number of worthwhile objectives. A coupling assembly is provided having an electrical jumper which is not directly attached to fluid conveying lines. The electrical jumper is positioned inwardly of the coupling assembly to minimize access thereto and prevent possible unwanted alterations thereof. The electrical jumper uses the contact between its arms and the fluid conveying members to provide a torque for further assuring electrical continuity between the fluid conveying members. As a result, the fluid conveying members or lines are not electrically insulated from each other and the build up of an electrostatic charge on one of the conveying lines is substantially prevented. Additional advantages of the present invention will become readily apparent from the following discussion when taken in conjunction with the accompanying drawings.

BRIEF DESCRIPTION OF THE DRAWINGS

FIG. 1 is an exploded perspective view of the coupling assembly of the present invention showing the various interconnected parts;

FIG. 2 is a transverse section of the coupling assembly showing the contacting of the electrical jumper arms with the annular flanges;

FIG. 3 is an enlarged, perspective view of the electrical jumper of the present invention; and FIG. 4 is an enlarged, fragmentary end view of the electrical jumper illustrating the torque feature thereof.

DESCRIPTION OF THE PREFERRED EMBODIMENT

In accordance with this invention, a threadless coupling assembly 10 is illustrated in FIG. 1 and includes a pair of tubular configured conveying members or conduits 12, 14. At each of the conduit confronting ends, an annular flange 16, 18 is fixedly attached. Conduits 12, 14 can be used to convey pressurized fluid, such as jet fuel.

Coupling assembly 10 further includes a pair of resilient sealing rings 20, 22 and a sleeve or band 24. Ring 20 is placed in groove 26 of flange 16 while ring 22 is placed in groove 28 of flange 18. Groove 26 is formed between annular inner shoulder 30 and annular outer shoulder 32 of flange 16 while groove 28 is formed between annular inner shoulder 34 and annular outer shoulder 36 of flange 18. Sleeve 24 then peripherally surrounds and seats against the rings 20, 22. Sleeve 24 is provided to axially bridge the space between outer shoulders 32, 36 of flanges 16, 18, respectively. Ring 20 establishes a fluid tight seal between flange 16 and sleeve 24 while ring 22 establishes a fluid tight seal between flange 18 and sleeve 24.

Also illustrated in FIG. 1 is coupler 38 of coupling assembly 10 which is provided to peripherally surround sleeve 24. Coupler 38 includes two complementary coupling halves 40, 42. Each of the coupling halves 40, 42 arcuately extends substantially 180 degrees around sleeve 24 and seats against the periphery of sleeve 24. A retaining assembly 44 is used to releasably interconnect the coupling halves 40, 42 at first ends thereof while a hinge member 46 pivotally connects the second and opposite ends of the coupling halves 40, 42 so that they can be spread circumferentially apart for assembling the split coupler 38 sleeve 24 and for removing the split coupler 38 therefrom.

Each of the coupling halves 40, 42 has a pair of axially spaced ribs 48, 50. A channel 52 is formed between rib 48 and a ridge 54 while a channel 56 is formed between rib 50 and a ridge 58. In assembled relation, the outside shoulders 32, 36 of flanges 16, 18, respectively, are disposed axially between the ribs 48, 50 so that outside shoulders 32, 36 are axially abutable with ribs 48, 50 to minimize relative displacement of flanges 16, 18 away from each other.

At least one coupling half 40, 42 has an electrical or bonding jumper 60 secured thereto and, as depicted in FIGS. 1 and 2, a second bonding jumper 60 is preferred for redundancy. The bonding jumper 60 is metallic and electrically conductive and, as best seen in FIG. 3, includes a straight, cylindrical-shaped elongate body portion 62, a pair of insert members 64, 66 integrally joined to each of the opposing ends of body portion 62, and first and second arms 68, 70 integrally joined to each of the insert members 64, 66. First arm 68 extends from insert member 64 in a direction opposite the extension of second arm 70 from insert member 66. The cylindrical-shaped body portion 62 is essentially uniform throughout and in the order of 0.020 inches in diameter. Each of the arms 68, 70 has a looped end 72, 74 and each of the arms 68, 70 is formed at an obtuse angle to each other.

The bonding jumper 60 is secured to one of the coupling halves 40, 42 by wedging the insert members 64, 66 into slots 76 formed in the ribs 48, 50, as shown in FIG. 2. The insert members 64, 66 are formed substantially U-shaped and the mouth of the U-shape is positioned downwardly against the coupling halves 40, 42 so that each of the arms 68, 70 extends upwardly from each coupling half 40, 42. The body portion 62 transverses or extends laterally between the ribs 48, 50 across the inner circumferential wall 78 of the coupling halves 40, 42. When the insert members 64, 66 are properly positioned in the slots 76, the arms 68, 70 are located in the channels 52, 56 on the sides of the ribs 48, 50 opposite those sides which form the boundary of or define the inner circumferential wall 78.

The bonding jumper 60 is provided since sleeve 24 may be so positioned that it does not contact either of the flanges 16, 18. When this occurs, sealing rings 20, 22 may electrically insulate conduits 12 and 14 from each other since sealing rings 20, 22 are usually made from electrical insulating material. This lack of electrical continuity between conduits 12 and 14 is hazardous when coupling assembly 10 is used to couple sections of conduit which convey jet fuel or other readily ionizable fluids because free ions may store an electrical charge on one of the coupled members so that, if that coupled member is grounded or if continuity is subsequently established between flanges 16, 18, a spark may occur in the presence of a mixture of vaporized fluid and air to cause an explosion.

Referring now to the retaining assembly 44, it is seen from FIGS. 1 and 2 that this assembly includes an anchor member 80 connected to the outer surface of coupling half 40 adjacent an end thereof opposite the end to which hinge member 46 is fastened. The anchor member 80 is in the form of a clevis which receives rod portions of bent clasp 82. The rod portions are joined together to form the generally rectangular clasp 82. Similar to the anchor member 80, a base member 84 is connected to the outer surface of coupling half 42 adjacent an end thereof, as illustrated in FIG. 2. A latch member 86 having a lip 88 is integrally joined to the base member 84 at an end thereof. A lever member 90 having a knotch 92 and opening 94 is pivotally connected to base member 84 by pin 96.

After the coupling halves 40, 42 are positioned circumferentially around sleeve 24, the lever member 90 is pivoted to a position outwardly of the coupling half 42. The bent clasp 82 connected to coupling half 40 is placed to engage notch 92 of lever member 90. The lever member 90 is then pivoted in a direction away from coupling half 40 so that the adjacent extremities of coupling halves 40, 42 will be circumferentially drawn toward each other through the tension applied by means of the interconnection of the lever member 90 and clasp 82 to tightly clamp coupling halves 40, 42 circumferentially against sleeve 24.

When the elements of the coupling assembly 20 are assembled together, looped end 72 of first arm 68 bears against flange 16 outwardly of outside shoulder 32 and rib 48. The looped end 74 of the second arm bears against flange 18 outwardly of outside shoulder 36 and rib 50. As illustrated in FIG. 4, the contact between first arm 68 and flange 16 resulting from the clamping of coupler 38 about sleeve 24 produces a torque on body portion 62 which tends to force second arm 70 against flange 18. Correspondingly, the contact between second arm 70 and flange 18 produces a torque on body portion 62 which tends to force first arm 68 against flange 16. Consequently, electrical continuity between flanges 16, 18 through the bonding jumper 60 is substantially assured. As a result of this electrical continuity, there is no build up of a stored charge on one of the conduits 12, 14 and any electrical insulating that may occur in the coupling assembly 20 due to the sealing rings 20, 22 is substantially prevented since the bonding jumper 60 provides an electrical conductive, metallic connection between the coupled conduits 12, 14.

In view of the foregoing description of the present invention, a number of worthwhile advantages are readily discernable. A coupler having a bonding jumper is disclosed which is easily fastened to a pair of confronting conduits. The bonding jumper greatly minimizes the hazard of spark creation by alleviating the problem of the build up of a potential difference between fluid conduit members. The bonding jumper is relatively small in size and quickly and efficiently secured to the interior of the coupler. The arms of the bonding jumper are located outwardly of the ribs of the coupler so that they are readily visible. Significantly, the arms extend in opposite directions so that torques are produced tending to push the arms into strong electrical contact with the fluid carrying members and thereby assure electrical continuity therebetween.

Although the present invention has been described with reference to a particular embodiment thereof, it is readily appreciated that modifications and variations can be effected within the spirit and scope of this invention.

We claim:

1. A coupling assembly for interconnecting first and second fluid carrying conduit members, comprising:
    coupler means removably circumferentially engaging the conduit members to minimize displacement of the conduit members away from each other; and
    at least one electrical conductive resilient jumper attached to said coupler means having an elongate body portion with a longitudinal axis, a first arm and a second arm each connected substantially at right angles to opposite ends of said elongated body portion, said first arm extending in a direction opposite said second arm so that, upon engagement of said first arm with the first conduit member, a torque is produced around said axis of said body portion tending to force said second arm against the second conduit member while said second arm produces a torque around said axis of said body portion in the opposite direction so that a strong electrical contact between said electrical jumper and each of the conduit members is provided.

2. The coupling assembly, as claimed in claim 1, wherein:
    said coupler means includes an arcuate-shaped coupler half having a pair of spaced ribs formed on the inner side thereof, the space between said ribs being defined by an inner circumferential wall; and
    said body portion of said electrical jumper transversing said inner circumferential wall, and said first and second arms being positioned on the outside of and substantially parallel to said respective ribs so that the contact between said arms and the respective conduit members is readily visible and unobstructed by said ribs.

3. The coupling assembly, as claimed in claim 2, wherein:
    said arms form an obtuse angle with respect to each other so that said opposite torques are produced by said arms around said longitudinal axis of said body portion to urge said arms into contact with the conduit members.

4. The coupling assembly, as claimed in claim 3, wherein:
    each of said arms terminates in a looped end which is engagable with the respective conduit members.

5. The combination of a coupling assembly and a coupler in which the coupling assembly includes a pair of conduit members, a pair of annular flanges fixedly attached to each of the confronting ends of the conduit members and each flange having an outside shoulder and an inside shoulder defining a groove therebetween, a sealing ring positioned in each of the flange grooves, a sleeve circumferentially surrounding the sealing rings and each of the flange inside and outside shoulders, said coupler including:
    a pair of arcuate-shaped coupling halves pivotally joined together for circumferentially surrounding the sleeve, each of said coupling halves including a pair of spaced ribs extending inwardly from the circumferential edges of said coupling halves, an inner circumferential wall defining the space between the ribs;
    retaining means for releasably securing said coupling halves together about the sleeve; and
    at least one resilient bonding jumper connected to one of said coupling halves, said bonding jumper including an elongate body portion having a longitudinal axis and a first arm and a second arm, said arms each being connected at substantially right angles to opposite ends of said body portion, said first arm extending in a direction opposite that of said second arm and at an obtuse angle thereto, said body portion extending laterally between said ribs across said inner circumferential wall with each of said arms being positioned outwardly of said ribs and the outer shoulders of the flanges and extending generally parallel to said ribs and shoulders and toward said flanges so that, when said coupling halves are secured together about the sleeve, each of said arms contacts one of said flanges to produce a torque around said axis of said body portion tending to force the other of said arms against the other of the flanges thereby maximizing electrical continuity between the flanges and the conduit members.

6. The combination, as claimed in claim 5, wherein:
    said bonding jumper includes a pair of generally u-shaped insert members joining each of said arms to said body portion and lying in a common plane with said body portion; and
    each of said ribs includes a slot for receiving one of said insert members, each of said slots having a dimension such that said insert members are wedgeably fitted therein to secure said bonding jumper to said coupling half.

* * * * *